Nov. 17, 1953          E. L. BENNO          2,659,651
GRAPHIC RECORDER
Filed March 9, 1953
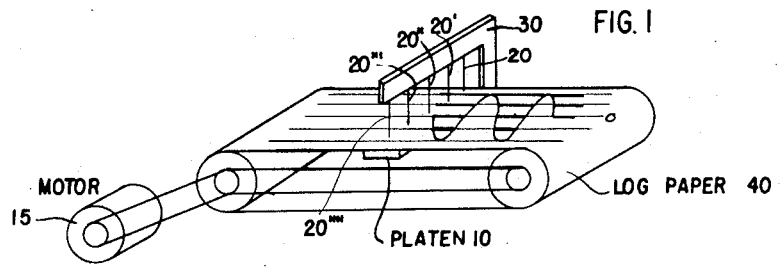
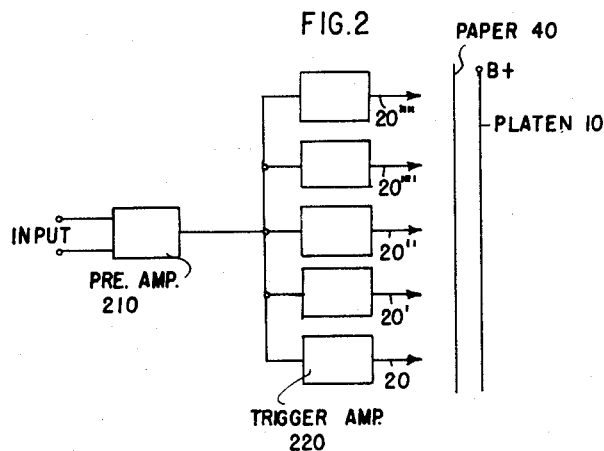
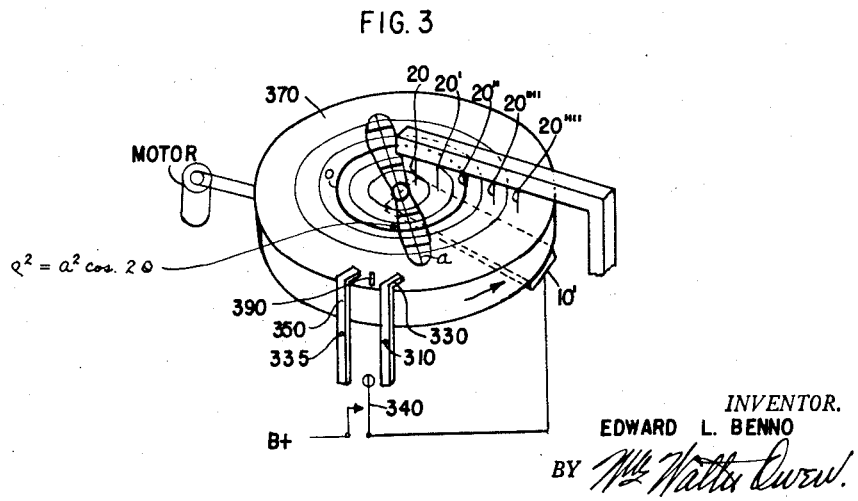
INVENTOR.
EDWARD L. BENNO
ATTY.

Patented Nov. 17, 1953

2,659,651

UNITED STATES PATENT OFFICE 2,659,651

GRAPHIC RECORDER

Edward L. Benno, Skokie, Ill., assignor to Automatic Electric Laboratories, Inc., Chicago, Ill., a corporation of Delaware Application March 9, 1953, Serial No. 341,029

6 Claims. (Cl. 346—34)

This invention is generally related to improvements in graphic recorders and more specifically to an improvement in high-frequency direct indicating oscillographs with fixed styli of the type disclosed in a co-pending application by MacDonald, Serial No. 305,164, filed August 19, 1952.

Prior art means for producing electrical wave forms include cathode ray oscillographs and facsimile type mechanisms. The cathode ray technique produces only a visible non permanent record of a specific wave form and necessitates the taking of photographs for permanency, whereas the present method eliminates time delay problems arising in taking photographs of a wave form produced by means of a cathode ray oscillograph and instantaneously provides a permanent record. Facsimile type mechanisms are not inherently adjustable to produce a permanent record of a high-frequency electrical wave form due to the inertia of the scanning and reproducing apparatus. The MacDonald invention was designed primarily to produce an immediately available record of a high-frequency wave form, and the present invention is an improvement over the MacDonald technique with the object of producing a record of higher-frequency wave forms, that is capable of easier and more accurate analysis than the record produced by any other technique.

Therefore the present invention has for its further object the graphic reproduction of a high-frequency wave form in greater accuracy and detail than has hitherto been possible.

Among the features whereby the objects of this invention are accomplished are the logarithmic arrangement of styli for passing an electrical current through electrically sensitive logarithmic graph paper for producing a record properly representing the high-frequency wave form.

Another feature of this invention is the use of polar-coordinate paper mounted on a high speed rotatable disc for the purpose of securing an accurate reproduction of high-frequency wave forms, and thereby avoiding many of the problems inherent in roller mounted paper such as slippage and breakage.

Other objects and features will become apparent from a perusal of the following specification, claims and drawings; of which Fig. 1 is a perspective drawing of one embodiment of the invention; Fig. 2 is a diagrammatic drawing of the circuit arrangement and Fig. 3 is perspective drawing of the second embodiment of this invention.

The first embodiment of the invention comprises a paper drive mechanism which moves a length of electrically sensitive paper at a certain speed over a platen, said paper having reproduced thereon logarithmic scales whereby indications left on said paper may be plotted, a bar having a number of styli logarithmically arranged therein corresponding to the scales on the paper and projecting over the paper and closely adjacent to the platen, and a number of trigger amplifiers connected in parallel to the source of the input signal. It is to be noted that this logarithmic form of reproduction permits a large comparative spread on the scale at the lower voltages as opposed to the higher voltages, and therefore the lower voltages are capable of being more easily analyzed. This is useful for the study of wave forms wherein the lower voltages are especially important. The styli are connected to a group of trigger amplifiers such as the well-known Evans amplifiers. One amplifier is connected to each stylus. Each of the trigger amplifiers are differently biased so that each one will start to conduct current only when the voltage applied to the input side of the amplifier reaches the voltage to which the amplifier has been biased. One of the amplifiers is biased at or near zero bias. Part of the remaining amplifiers are biased negatively in increasing negative amounts from the zero biased amplifier. The remaining amplifiers are biased positively in increasing positive amounts from the zero biased amplifier. The inputs of the trigger amplifiers are all connected in parallel to a first preamplifier, and the electrical wave form to be recorded is applied to the input side of the first preamplifier. Therefore, as the input wave form is applied to the preamplifier it is amplified, and in turn applied in parallel to the trigger amplifiers. As one stage of the trigger amplifiers conducts, it causes a flow of current through the stylus to which that amplifier is connected. The current in turn passes from the stylus through the electrically sensitive paper to the platen. As current passes through the platen a mark is left on the electrically sensitive paper. Therefore the negatively biased amplifiers conduct on the positive portion of the wave form and the envelope about the marks on the graph paper constitutes this portion of the wave form, and the positively biased amplifiers stop conducting on the negative portion of the wave form and the outline of the blank space enclosed by the marks on the graph paper constitutes this portion of the wave form. As the wave form voltage drops below the triggering voltage, the stage ceases to conduct and a mark is no longer formed on the paper. The record on the paper will therefore consist of a series of spaced parallel lines of varying length, the ends of which will trace the input wave form. It is to be noted at this point, that the present embodiment does not show a phase inverter. It may easily be added in order to record the negative portions of the input wave form in the same manner that the positive portions are recorded.

In the second embodiment of the invention the electrically sensitive paper, having polar-coordinates marked thereon, is mounted on a rotatable disc and is therefore inherently capable of much faster movement than MacDonald's drive mechanism, so that it is possible to record much higher frequencies, since the paper may be rotated very rapidly without being torn or slipping. It will be especially noted that this embodiment is particularly adaptable to the reproduction of harmonic and trigonometric wave forms and for their mathematical analysis. When dealing with a harmonic wave form the periodicity of the disc may be varied to different functions of the periodicity of the harmonic wave. In this latter embodiment, the amplifiers connected from the middle stylus to the stylus in the center of the disc are biased increasingly positive and the amplifiers connected to the other styli are biased increasingly negative in the other direction, so that the latter styli conduct only on the positive portions of the input wave form. The amplifiers will cease conducting in a descending order from the circumference of the disc as the input wave form becomes increasingly negative, and will begin to conduct in an ascending order toward the circumference of the disc as the input wave becomes increasingly positive, to leave a graphic reproduction of the input wave form consisting of a series of parallel marks of varying length, the ends of which will define the input wave form in polar-coordinates. The area represented by the negative portion of the input wave form will be defined by the zero reference line and the blank space between the zero reference line and the center of the disc. The styli may also be logarithmically spaced in the second embodiment if desired. The rotatable disc is further provided with a switching arrangement for halting the reproduction after one revolution of the disc to prevent confusion in marking, however it is possible, by allowing the disc to rotate more than once, to secure a repetitious record of the wave form so that a determination may be made as to whether the wave is purely harmonic.

Proceeding now with the detailed description, it is to be noted that the input wave form is applied to the preamplifier 210 shown in Fig. 2, and the amplified wave form is then applied in parallel to the trigger amplifiers 220. For purposes of explanation, only five trigger amplifiers are shown, but more can be used dependent upon accuracy desired. The center amplifier connected to stylus 20″ is biased at a point corresponding to the zero point of the input wave form, which would be just at cut-off, and is therefore conductive whenever the input signal wave is positive. The amplifiers connected to stylus 20′ and stylus 20 respectively are biased increasingly positive. The amplifiers connected to stylus 20‴ and 20⁗ are respectively biased increasingly negative so as to correspond to the positive bias on the amplifiers connected to stylus 20′ and 20 respectively. This arrangement is used in connection with both embodiments of the invention. As mentioned previously, if desirable a phase inverter may be used so as to enable certain of the amplifiers to conduct during the negative portions of the input wave so that its reproduction may be represented by marks instead of blank spaces.

Referring now to the first embodiment of the invention shown in Fig. 1, it will be seen that as the motor 15 moves the electrically sensitive paper 40, having a logarithmic scale thereon, under the arm 30 holding the styli therein, a series of marks will be formed on the electrically sensitive paper 40 as current passes through the paper from styli 20″—20, which are biased positively, to the platen. As the input wave form applied to the amplifiers becomes more positive, a series of marks will be left on the electrically sensitive paper as styli 20‴—20⁗ begin to conduct through the portion of the paper previously unmarked above the zero reference point on the log paper, and then as the input wave form becomes more negative, 20⁗ and 20‴ cease conducting in that order, and the log paper again appears unmarked above the zero reference point. As the input wave form becomes still more negative styli 20″—20 cease conducting in the same order to thereby leave an unmarked area on the paper 40 below the zero reference point. This unmarked area comprises the negative portion of the input wave form. The paper 40 is a semi-log paper, the log scale provided transverse to the direction of movement of the paper so that large graphic curves are shown for the small input voltages in comparison to the high input voltages, thereby enabling easier mathematical computation and more accurate reading of the reproduced wave form.

Turning now to Fig. 3, disclosing the second embodiment of the invention, it will be immediately seen that the rotatable disc provided here is capable of the reproduction of much higher frequencies. The graph paper having polar-coordinates printed thereon is also provided with a zero reference point thereon underneath stylus 20″. As the paper used is marked with polar-coordinates the logarithmic arrangement of the styli need not be used unless for some special purpose. In this form a few additional attachments are shown which are not primarily concerned with the invention and are merely for the purpose of controlling the number of reproductions of the wave form. As it is necessary to secure a constant measured rate of rotation before reproduction of the wave form, disc 370 is rotated by the motor while its speed is measured by a tachometer until it reaches a steady desired speed of rotation, and in the meantime the tubes may be warming. When the desired rate of rotation is reached arm 330 is placed in position to contact pin 390 so that contacts 340 are closed when arm 330 pivots at 310 on being moved by pin 390, so that the B+ voltage is now applied to the platen 10′ and the plates of the various amplifier tubes through the electrically sensitive paper. As the disc rotates the styli will conduct in the same manner as before described to leave marks on the graph paper such as for example are shown in Fig. 3, and corresponds to the form $p^2 = a^2 \cos 2\theta$ in which an $a$ is the distance from the center of the disc to the farthest point of the wave envelope from the center of the disc. As the pin 390 returns to its original position it strikes arm 350 which on being struck pivots on pin 335 to cause contacts 340 to open and thereby break the circuits to the trigger amplifiers 220, and prevent further reproduction of the wave form. If desired arm 350 may be removed with contacts 340 closed, and therefore many reproductions of the wave form can be secured on the paper mounted on the disc, so that it is possible by observing the graph of each reproduction to determine the period of the wave form and whether the wave form is purely harmonic and other desired information.

Thus having described several embodiments of my invention but not limiting myself thereto what I claim is:

1. In a direct indicating oscillograph for recording electrical wave forms, an electrically sensitive paper having marked thereon a logarithmic scale, means for moving said paper longitudinally at high speed, a platen mounted below and transverse to the direction of movement of said paper, styli arranged in positions corresponding to said logarithmic scale on said paper and said styli mounted transversely above and adjacent to said paper and parallel to said platen, a plurality of amplifiers, means for applying an electrical wave form to said amplifiers, a source of biasing potential connected to said amplifiers and arranged to bias each of said amplifiers differently than the other to thereby allow said amplifiers to operate only on portions of said wave form corresponding to said biasing potentials, each of said amplifiers connected to corresponding ones of said styli to thereby produce a permanent logarithmic record of said electrical wave form on said paper in accordance with the traces left upon said paper by the passage of current from said styli to said platen.

2. In a direct indicating oscillograph for recording electrical wave forms, an electrically sensitive paper, means for moving said paper, a platen mounted adjacent and below said paper and transverse to the direction of movement of said paper, a plurality of styli mounted adjacent and above said paper and platen and parallel to said platen, a plurality of amplifiers each connected to a corresponding stylus, means for biasing each of said amplifiers differently to thereby allow each of said amplifiers to operate during a corresponding portion of an applied electrical wave form, means for applying an electrical wave form to said amplifiers for thereby causing certain of said biased amplifiers to conduct current through said styli, said electrically sensitive paper, and said platen during certain portions of said wave form and cause others of said amplifiers to cease conduction during other portions of said wave form to thereby produce a permanent record of said wave form on said paper consisting of marked portions on said paper resulting from the conduction of current through said paper and unmarked portions on said paper resulting from the termination of conduction of current through said paper.

3. In a direct indicating oscillograph for recording electrical wave forms, an electrically sensitive paper, means for moving said paper rotatably, a platen mounted below and transverse to the direction of movement of said paper, styli mounted above said platen and said paper and adjacent said paper and parallel to said platen, a plurality of amplifiers, a source of biasing potential for said amplifiers, each of said amplifiers biased different than its adjacent amplifier and each amplifier connected to a corresponding one of said styli, means for applying an electrical wave form in parallel to said amplifiers, said paper having polar-coordinates marked thereon so that when said amplifiers are conducting or non-conducting in accordance with the particular wave form or portion thereof applied thereto a reproduction of said wave will be secured on said polar paper in accordance with markings on said paper caused by the conduction or non-conduction of current through said paper to thereby secure reproductions of trigonometric harmonic wave forms.

4. In a direct indicating oscillograph for recording electrical wave forms on electrically sensitive paper, means for moving said paper, a platen mounted below and transverse to the direction of movement of said paper, a plurality of styli logarithmically arranged and mounted above said platen and said paper and adjacent to said paper and parallel to said platen, a plurality of amplifiers each connected to one of said styli, a source of biasing potential for said amplifiers for biasing each of said amplifiers different than its adjacent amplifier, and means for applying electrical wave forms in parallel to said amplifiers for causing certain of said amplifiers to conduct current sequentially through their corresponding styli, paper and platen and sequentially cease conducting during other portions of said wave form to thereby leave a series of marks and blank spaces on said paper, the envelope of said marks and blank spaces corresponding to the input electrical wave form.

5. In a direct indicating oscillograph for recording electrical wave forms, an electrically sensitive paper having logarithmic scales marked thereon, means for moving said paper longitudinally, a platen mounted below and transverse to the direction of movement of said paper, a plurality of styli mounted above said platen and said paper and adjacent to said paper and parallel to said platen, said styli logarithmically arranged in correspondence with said scales, a plurality of amplifiers each of which is connected to a stylus, a source of biasing potential for biasing said amplifiers differently from each other and corresponding to the arrangement of said styli, means for applying the electrical wave form in parallel to said amplifiers for thereby causing certain of said amplifiers to conduct sequentially and causing others to cease conducting sequentially during various portions of said wave form for thereby producing a series of marks and blank spaces on said paper depending on the conduction of current from said amplifiers through said styli, paper and platen for thereby reproducing a sinusoidal wave form on said paper.

6. In a direct indicating oscillograph for recording electrical wave forms, an electrically sensitive paper, means for rotating said paper, a platen mounted below and radially to the axis of rotation of said paper, styli mounted above said platen and said paper and adjacent said paper and parallel to said platen, a plurality of amplifiers, a source of biasing potential for said amplifiers, each of said amplifiers biased different than its adjacent amplifier and each amplifier connected to a corresponding one of said styli, means for applying an electrical wave form in parallel to said ampliers, said paper having polar-coordinates marked thereon so that when said amplifiers are conducting or non-conducting in accordance with the particular wave form or portion thereof applied thereto a reproduction of said wave will be secured on said polar paper in accordance with markings on said paper caused by the conduction or non-conduction of current through said paper to thereby secure reproductions of harmonic wave forms.

EDWARD L. BENNO.

No references cited.